April 5, 1949.        M. A. WOOD        2,466,192
COMBINATION OF ELECTRICAL UNITS AND
METHOD OF MOUNTING THE SAME
Filed Aug. 7, 1944
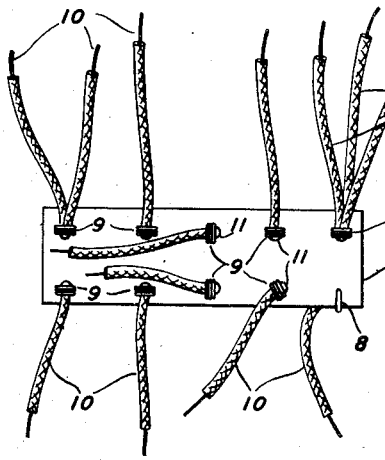
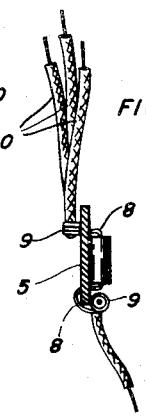
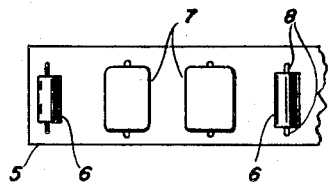
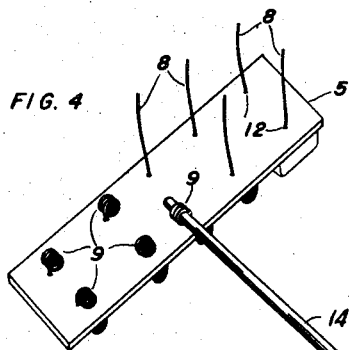
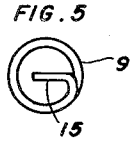
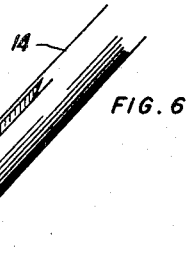
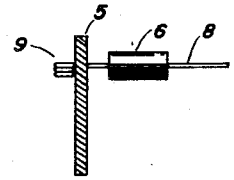
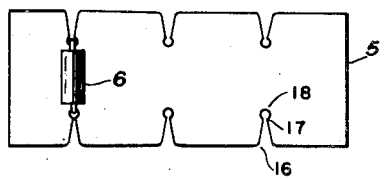
INVENTOR.
MERRILL A. WOOD
BY D. Clyde Jones
ATTORNEY Patented Apr. 5, 1949

2,466,192

UNITED STATES PATENT OFFICE 2,466,192

COMBINATION OF ELECTRICAL UNITS AND METHOD OF MOUNTING THE SAME

Merrill A. Wood, Rochester, N. Y.

Application August 7, 1944, Serial No. 548,415

3 Claims. (Cl. 173—324)

This invention relates to a combination of electrical units, such as resistors, inductors and capacitors, as well as to a method of mounting such units for use in radio receivers and the like.

In the manufacture of electrical equipment, such as radio receivers and transmitters, it is frequently necessary to mount a plurality of electrical units in spaced relation on the chassis of the receiver for electrical connection into the circuits thereof. In the past, these electrical units, each of which usually is provided with two projecting conductors, have been assembled in spaced relation by electrically connecting the conductors of the units to conducting terminal connectors secured to a so-called terminal strip made of insulating material. Usually the mounting of such terminal connectors involved forming holes in the terminal strip as well as in the connector to receive hollow rivets or screws secured in the respective holes. The pair of conductors of each unit was thereafter electrically connected such as by soldering to a pair of the terminal connectors. From the foregoing it will be seen that the assembling of electrical units in the past has required the making of the terminal connectors, fastening these connectors on a terminal strip and then connecting the conductors of each unit to a pair of connectors.

In accordance with one of the main features of the invention, there is provided a method of mounting electrical units on a terminal strip whereby a substantial saving in time and material is effected.

Another feature of the invention relates to the novel method of forming the ends of conductors of an electrical unit, inserted through openings in a terminal strip, so that the formed ends of the conductors not only secure the unit to the strip but these ends also serve as terminals to which circuit conductors can be soldered.

A further feature of the invention relates to an electrical unit assembly wherein an electrical unit or units are fastened to a terminal strip by the coiled ends of the conductors of these units.

Other features and advantages of the invention will appear from the detailed description and claims when taken with the drawings in which:

Fig. 1 is a view of one main surface of a terminal strip with electrical units mounted thereon and having circuit conductors joined to the respective terminals of the electrical units;

Fig. 2 is an end view of the terminal strip shown in Fig. 1;

Fig. 3 is a fragmentary view of the other main surface of the terminal strip of Fig. 1;

Fig. 4 is a perspective view illustrating several of the stages of the method followed in the mounting of the electrical units on the terminal strip, together with a tool suitable for this purpose;

Fig. 5 is an enlarged detail view of one of a terminal coil;

Fig. 6 is an enlarged fragmentary view of the tool completely shown in Fig. 4; and Figs. 7 and 8 illustrate modified forms of the invention.

While the invention has wide application and may assume various forms, several specific forms thereof will be herein described. In the combination illustrated in Figs. 1 to 4 inclusive, there is provided a terminal strip 5 of insulating material. On one face of this strip there is mounted in spaced relation electrical units, such as resistors 6 and capacitors 7. Each of these units has a pair of conductors 8 extending therefrom and formed into integral coils 9 to whch various circuit conductors 10 can be soldered, as indicated at 11.

While the electrical units can be attached on the strip 5, in any suitable manner, in accordance with this invention, the attachment is effected by providing spaced openings 12 in the strip through which the respective conductors 8 are inserted as shown especially in Fig. 4. The projecting ends of these conductors are formed into coil terminals 9. Each coil terminal is generated by the use of a tool, generally designated 13. This tool includes a rod 14 having a diameter approximating the internal diameter of the desired coil terminal. This rod has a kerf 14a cut therein to receive the free end of a projecting conductor 8. With this end of the conductor in the kerf, the tool may be rotated in either direction to wind the projecting end portion of the conductor on the rod 14 of the tool in the manner indicated in Fig. 4. This winding operation is preferably continued until the resulting coil terminal draws the electrical unit snugly against the other side of the terminal strip 5. The finished coil terminal 9, as shown in the enlarged detail view of Fig. 5, has the free end 15 of the conductor extending across a substantial portion of one end of the coil. This extending end of the conductor serves as a stop when a circuit conductor 10 is inserted in the coil terminal. With the circuit conductor 10 thus inserted, molten solder 11 is dropped into the coil terminal 9 to solder this terminal to the circuit conductor.

It will be noted from Fig. 1 that the axis of the coil terminal 9 can be oriented in various directions to facilitate the soldering of circuit conductors 10 thereto. The orientation of the terminal coil may be effected by the tool 13 when the coil terminal is being generated or the coil can be turned in the desired direction, by means of a pair of pliers. The use of the coil terminal 9 does not limit the arrangement to the attachment of a single circuit conductor 10 thereto but instead two or even three circuit conductors can be soldered to a given coil terminal, as the occasion demands. Furthermore, the coil terminal does not necessarily have to be located at the surface of the terminal strip opposite the surface on which the electrical unit is mounted. Instead, the projecting conductor 8 of an electrical unit mounted on one surface of the strip, after passing through the hole in the terminal strip, can be drawn around to the first-mentioned surface of the strip (Fig. 2) where a coil terminal can be generated.

While each electrical unit has been illustrated in the preceding views with both of its conductors formed into coil terminals, it will be understood that a single one of these conductors 8 can be inserted through a hole in the terminal strip after which the free end of the conductor can be formed into a coil terminal, as shown in Fig. 7. In this arrangement, the other conductor 8 may project into space.

In the modification shown in Fig. 8, the terminal strip 5 has notches 16 formed in two of its opposite edges. The mouth of the notch is wider than the diameter of the conductor 8. However, the notch narrows down at 17 to a width providing a snug fit with the conductor 8. The notch terminates in a circular portion 18 wherein the conductor 8 normally rests. In this modification, the conductors 8 are first formed into the coil terminals 9. Thereafter, the portion of each conductor 8 between its coil 9 and the electrical unit is passed through the notch 16 and into the circular portion 18 of the notch, where it is retained by the constructed part of the notch.

In this description and in the claims, the term opening includes both holes and notches in the terminal strip.

The present disclosure is typical of the invention and is not to be taken in a limiting sense except as specified in the following claims.

What I claim is:

1. The method of fastening an electrical unit with its projecting conductors to a mounting strip and connecting a circuit conductor to each projecting conductor, which method comprises the successive steps of providing a pair of spaced openings in said strip, inserting said projecting conductors respectively through said openings whereby said unit is positioned at one side of said strip, winding the projecting end of each conductor into a hollow coil with the tip end of the conductor extending at least part way across the opening through the coil, the diameter of the coil being larger than that of the opening, inserting the end of a circuit conductor into each resulting coil as far as the mentioned tip end thereof, and substantially filling the coil with molten solder to embrace the inserted end of the circuit conductor.

2. An electrical assembly comprising an insulating strip having pairs of openings therein, an electrical unit for each pair of openings, each unit being provided with a pair of conductors projecting therefrom, the conductors of a pair being inserted through a pair of openings in the strip, a hollow coil integral with each conductor and with at least one coil turn abutting one surface of said strip across a related opening therein, and a circuit conductor inserted in each coil, and solder substantially filling the coil.

3. An electrical assembly comprising an insulating strip having a notch in each of its opposing edges, an electrical unit having two projecting conductors each terminating in a hollow integral coil, the conductors passing through the respective notches with the unit at one side of the strip and with the coils abutting the other side thereof at said notches, a circuit conductor inserted in each coil, and solder substantially filling the coil.

MERRILL A. WOOD.

REFERENCES CITED

The following references are of record in the file of this patent:

UNITED STATES PATENTS

| Number | Name | Date |
|---|---|---|
| 508,643 | Southworth | Nov. 14, 1893 |
| 640,533 | Callahan | Jan. 2, 1900 |
| 737,720 | Duncan | Sept. 1, 1903 |
| 744,650 | Varley | Nov. 17, 1903 |
| 768,261 | Amundson | Aug. 23, 1904 |
| 848,085 | Brewer | Mar. 26, 1907 |
| 1,241,737 | Johnson | Oct. 2, 1917 |
| 1,275,103 | Swanson | Aug. 6, 1918 |
| 1,303,524 | Tomlinson | May 13, 1919 |
| 1,642,223 | Boker | Sept. 13, 1927 |
| 1,871,292 | Alden | Aug. 9, 1932 |
| 1,983,267 | Browne et al. | Dec. 4, 1934 |
| 2,023,517 | Creager | Dec. 10, 1935 |
| 2,062,886 | Jensen | Dec. 1, 1936 |
| 2,214,151 | Wagar | Sept. 10, 1940 |
| 2,242,533 | Meighan | May 20, 1941 |
| 2,270,166 | Heinsch et al. | Jan. 13, 1942 |
| 2,402,426 | Miles et al. | June 18, 1946 |

FOREIGN PATENTS

| Number | Country | Date |
|---|---|---|
| 875,749 | France | June 29, 1942 |